United States Patent Office 3,830,707
Patented Aug. 20, 1974

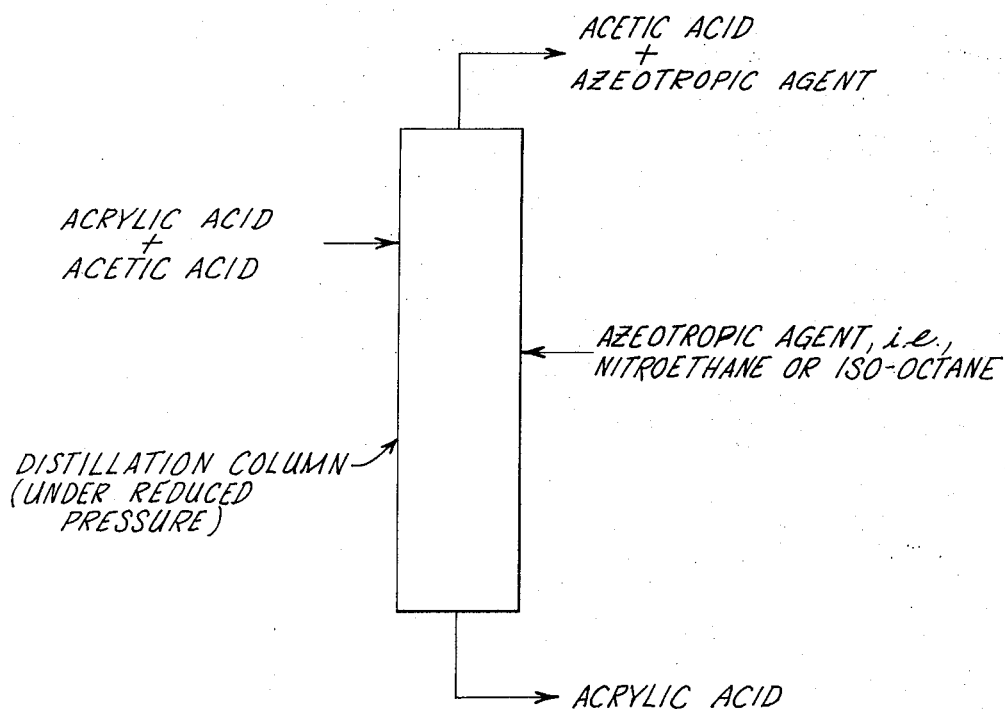

3,830,707
PROCESS FOR THE PURIFICATION OF
ACRYLIC ACID
Osamu Kageyama and Manabu Kai, Tsurugaoka, Takuya Miho, Ohtake, and Kunio Koga, Tsurugaoka, Japan, assignors to Daicel Ltd., Osaka, Japan
Filed Dec. 2, 1971, Ser. No. 204,314
Claims priority, application Japan, Dec. 8, 1970, 45/108,823
Int. Cl. B01d 3/10, 3/36
U.S. Cl. 203—8
1 Claim

ABSTRACT OF THE DISCLOSURE

Pure acrylic acid is obtained from a mixture containing acrylic acid and acetic acid by subjecting the mixture to an azeotropic distillation by employing isooctane or nitroethane as an azeotropic agent at a reduced pressure to remove acetic acid from the mixture.

The present invention relates to a process for obtaining pure acrylic acid from a mixture containing acrylic acid and acetic acid. More particularly, the present invention relates to a process for separating and purifying acrylic acid from mixtures thereof with acetic acid, which is characterized by removing acetic acid from the mixture by means of azeotropic distillation under a reduced presence and in the pressure of isooctane or nitroethane as an azeotropic agent or an entrainer.

In a process for producing acrylic acid by the vapour phase oxidation of propylene or acrolein, usually not more than 30% by weight (e.g. 10–30%) of a crude aqueous acrylic acid solution is obtained, which contains acetic acid in a molar ratio of from ⅕ to 1/300, based on the acrylic acid. The purpose of the present invention is to refine acrylic acid so produced by separating and removing acetic acid from said crude acrylic acid mixtures.

Various separation methods have hitherto been proposed, including those disclosed in British Patent Specification Nos. 997,324 and 997,325. Those methods comprise cooling the product obtained by the vapour phase oxidation of propylene or acrolein, absorbing the product in water to obtain an aqueous solution of acrylic acid containing acetic acid, and evaporating water therefrom. Alternatively, the aqueous solution of acrylic acid is extracted by adding a suitable solvent thereto to extract acrylic acid as well as acetic acid and the resulting extract is distilled to separate the solvent from acrylic acid containing acetic acid. The thus obtained mixture of acrylic acid with acetic acid, in which acetic acid is present in a molar proportion in the range of ⅕ to 1/300 based on the acrylic acid, is subjected to distillation under reduced pressure to remove acetic acid and to obtain pure acrylic acid.

However, a large number of plates or stages and a high reflux ratio are required in the distillation column for separating said mixture containing acrylic acid and acetic acid in such a simple distillation procedure, because the relative volatility of acrylic acid and acetic acid is small. So the temperature of the kettle is elevated because of pressure loss and the holding time in the distillation zone is prolonged. As a result, the polymerization of acrylic acid is accelerated so that it is difficult to separate acrylic acid by employing a simple distillation procedure.

Further, it has been already proposed in British Patent Specification No. 1,120,284 to refine acrylic acid by adding an entrainer which forms an azeotrope with acetic acid and carrying out an azeotropic distillation to separate acetic acid from the mixture. As entrainers or azeotropic agents to be used in said azeotropic distillation $C_7$-hydrocarbons such as toluene or n-heptane etc. have been known. However, according to our study, such known azeotropic agents are not sufficient for the purpose of the present invention.

BRIEF DESCRIPTION OF THE DRAWING

The drawing is a diagrammatic illustration of the invention.

We have studied azeotropic agents which form an azeotropic distillation mixture with acetic acid for separating acrylic acid from a mixture containing acrylic acid and acetic acid as mentioned above by employing azeotropic distillation and it has been found that isooctane and nitroethane have excellent properties as such azeotropic agents.

According to our study, it has been found that the composition of said azeotropic distillation mixture, which is composed of said azeotropic agent and acetic acid, is remarkably varied by the coexistence of acrylic acid. For instance, an azeotropic composition of isooctane-acetic acid at 80 mm. Hg comprises 22.5% by weight of acetic acid and its minimum azeotropic temperture is 34° C., but when acrylic acid co-exists and the weight ratio of acrylic acid/acetic acid is more than 5, the content of acetic acid in said azeotropic composition is 5.5% by weight and when the weight ratio of acrylic acid/acetic acid is less than 1, the content of acetic acid in said azeotropic composition is 22.5% by weight. From these results it is understood that the content of acetic acid in the azeotropic composition is remarkably varied when the weight ratio of acrylic acid/acetic acid is between 1 and 5.

It is thought that the phenomenon whereby the composition of the azeotropic mixture varies due to variations of the weight ratio of acrylic acid to acetic acid as described above may be affected by the affinity of acrylic acid.

Similar tendencies are recognized with nitroethane. For example, the following results are observed at 80 mm. Hg; when the weight ratio of acrylic acid/acetic acid is more than 5 the composition of an azeotropic mixture composed of nitroethane and acetic acid comprises 3.8% by weight of acetic acid and its minimum azeotropic temperature is 53° C. And the composition of an azeotropic mixture composed of n-heptane and acetic acid comprises 3.6% by weight of acetic acid and its minimum azeotropic temperature is 37° C.

As described above, isooctane and nitroethane as azeotropic agents are effective in smaller amounts, because they have a higher content of acetic acid in their azeotropic mixtures than the known n-heptane. It is understood that isooctane and nitroethane are excellent as azeotropic agents, because they are slightly soluble in water so that their recovery loss is small. Further, nitroethane having a nitro radical shows a polymerization inhibiting effect and it is effective in decreasing the loss of acrylic acid through polymerization. This has the remarkable advantages of preventing both the clogging due to the precipitation of polymers and the decrease of the heat conducting efficiencies, thus making it possible to smoothly conduct a continuous operation of purification and separation.

In order to obtain purified acrylic acid from a mixture containing acrylic acid and acetic acid by employing azeotropic distillation using isooctane or nitroethane as azeotropic agents according to the present invention, a known azeotropic distillation procedure is employed, in which pure acrylic acid is recovered from the bottom of the distillation column, while an azeotropic mixture of said azeotropic agent and acetic acid is distilled through the head of the distillation column. Acetic acid is extracted with water from the azeotropic mixture distilled through the head of the column, and the recovered azeotropic agent is returned into the distillation column. It is preferable that said distillation is conducted under a reduced pressure below 300 mm. Hg abs. in the presence of an appropriate polymerization inhibitor in order to prevent the polymerization loss. As said appropriate polymerization inhibitor, hydroquinone, hydroquinone monomethylether and the like are preferable.

The present invention is further explained with reference to the following examples.

EXAMPLE 1

A distillation column consisting of a combination of an Oldershaw tower with 20 stages and a packed tower of 4 cm. diameter x 37 cm. height was used. A mixture of 9.9% of acetic acid and 91.1% of acrylic acid was fed to the 21st stage of the apparatus at 31.6 gr./h. and isooctane was fed to the 16th stage of the apparatus at 74.8 g./h. under a reduced pressure of 80 mm. Hg abs. and a reflux ratio of 5. 28.5 gr./h. of the bottom product and 77.9 gr./h. of the distillate from the top of the column were obtained. The results are shown in Table 1.

EXAMPLE 2

The same apparatus as used in Example 1 was used, and 20.4 gr./h. of a mixture composed of 10.0% of acetic acid and 90.0% of acrylic acid and 51.0 gr./h. of nitroethane were fed thereto under the same conditions. 53.0 gr./h. of the column top distillate and 18.4 gr./h. of the bottom product were obtained. The results are shown in Table 1.

EXAMPLE 3

An Oldershaw tower with 40 stages was used, and 19.3 gr./h. of a mixture composed of 10.0% acetic acid and 90.0% of acrylic acid and 49.1 gr./h. of nitroethane were fed thereto at a reduced pressure of 62 mm. Hg abs. and at a reflux ratio of 5. 50.9 gr./h. of the column top distillate and 17.3 gr./h. of the bottom product were obtained. The results are shown in Table 1.

TABLE I

| Example | | Composition (percent by weight) | | | Weight ratio of solvent/acetic acid | Separation yield of acetic acid (percent) |
|---|---|---|---|---|---|---|
| | | Solvent | Acetic acid | Acrylic acid | | |
| 1 | Column top distillate | 96.1 | 3.9 | — | 23.8 | 99.0 |
|   | Bottom product | — | 0.1 | 99.9 | | |
| 2 | Column top distillate | 96.1 | 3.8 | 0.1 | 25.0 | 98.0 |
|   | Bottom product | — | 0.2 | 99.8 | | |
| 3 | Column top distillate | 96.3 | 3.6 | — | 25.4 | 100.0 |
|   | Bottom product | — | — | 100.0 | | |

What we claim is:

1. A process for separating acrylic acid from a mixture consisting essentially of acrylic acid and acetic acid, said method consisting of distilling the mixture at a pressure of below 300 mm. Hg abs. in the presence of nitroethane and separating acrylic acid as a bottom product therefrom.

References Cited

UNITED STATES PATENTS

| | | |
|---|---|---|
| 3,433,831 | 3/1969 | Yomiyama et al. 260—526 |
| 2,787,634 | 4/1957 | Coover et al. 260—526 N |
| 2,741,583 | 4/1956 | Vaughan et al. 203—8 |
| 3,725,208 | 4/1973 | Maezawa et al. 203—8 |
| 2,900,421 | 8/1959 | Kharasch et al. 203—8 |

OTHER REFERENCES

Horsley, Azeotropic Data II, 1967, p. 27.

WILBUR L. BASCOMB, JR., Primary Examiner

D. EDWARDS, Assistant Examiner

U.S. Cl. X.R.

203—57, 70, Dig. 21; 260—526 N